Figure 1:
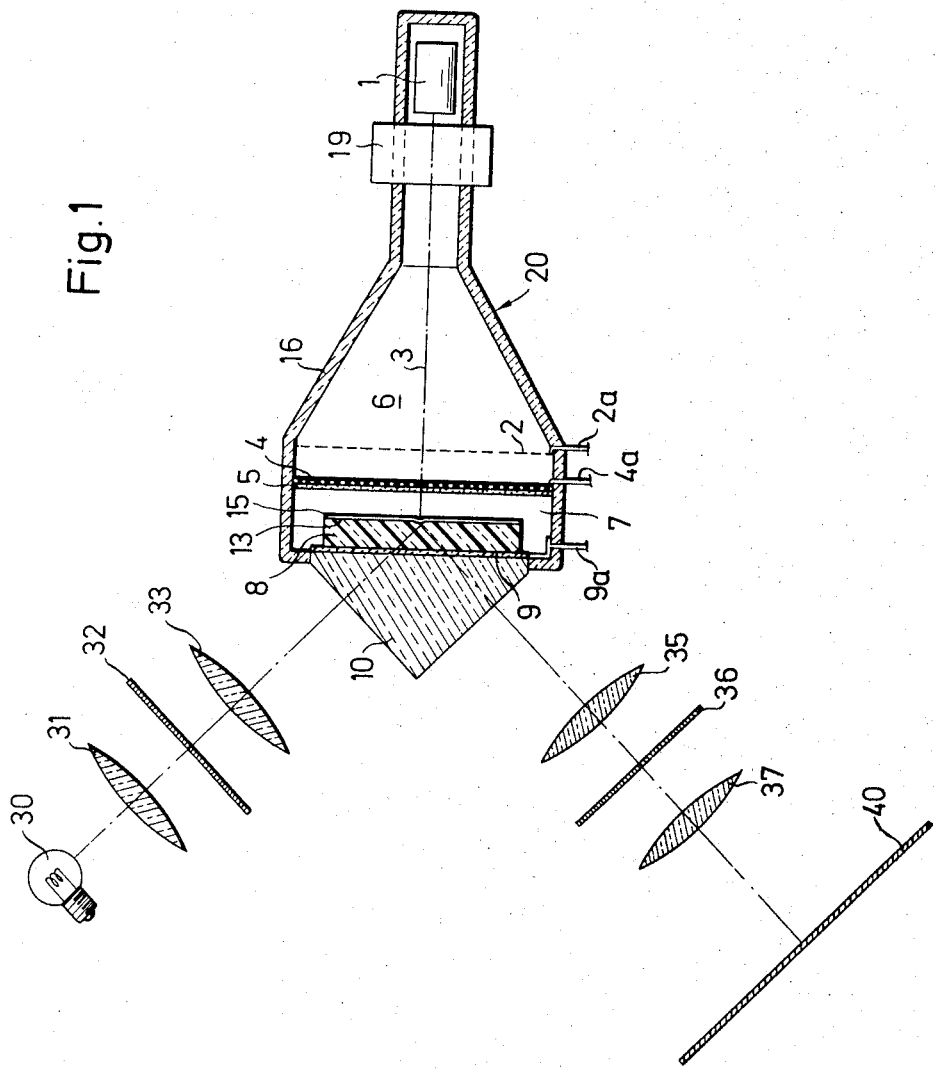

United States Patent [19]
Mast et al.

[11] 3,835,346
[45] Sept. 10, 1974

[54] CATHODE RAY TUBE

[75] Inventors: Fred Mast, Zuzwil; Ulrich La Roche, Zurich, both of Switzerland

[73] Assignee: Eidophor AG, Glarus, Switzerland

[22] Filed: Oct. 17, 1972

[21] Appl. No.: 298,233

[30] Foreign Application Priority Data
Oct. 27, 1971    Switzerland..................... 15685/71

[52] U.S. Cl. .......... 313/394, 350/160 LC, 350/161
[51] Int. Cl. ........................................... H01j 29/12
[58] Field of Search ......... 313/91; 350/160 LC, 161

[56] References Cited
UNITED STATES PATENTS

| | | | |
|---|---|---|---|
| 2,277,009 | 3/1942 | Von Ardenne | 313/91 |
| 3,667,830 | 6/1972 | Rottmiller | 313/91 X |
| 3,701,586 | 10/1972 | Goetz | 313/91 |
| 3,708,712 | 1/1973 | Van Raalte | 313/91 X |
| 3,716,289 | 2/1973 | Sun Lu | 350/160 LC |

FOREIGN PATENTS OR APPLICATIONS

| | | | |
|---|---|---|---|
| 6,510,766 | 2/1966 | Netherlands | 313/91 |

*Primary Examiner*—Archie R. Borchelt
*Assistant Examiner*—Saxfield Chatmon, Jr.
*Attorney, Agent, or Firm*—Pierce, Scheffler & Parker

[57] ABSTRACT

A cathode ray tube for a projection television system is provided having a charge layer dividing the tube envelope into two chambers. An electron gun is mounted in one of the chambers to provide an electron beam which is deflected over the charge layer and an electrostatically deformable modulation layer supported on an optically transparent support is provided in the other chamber, the free surface of the modulation layer facing the charge layer being deformable by the electrostatic forces provided in the charge layer by scanning thereof by the electron beam. An alternative form of tube is also provided in which the charge layer rests on the deformable modulation layer which is supported on an optically transparent surface of the envelope so that the modulation layer is totally enclosed and isolated from the rest of the tube envelope, the charge layer forming a vacuum tight partition.

6 Claims, 2 Drawing Figures

CATHODE RAY TUBE

This invention relates to a cathode ray tube for projection television systems, comprising a cathode ray tube having a cathode, a charge layer of an electrically non-conductive material, and an electrostatically deformable modulation layer, the charge layer being disposed between the modulation layer and the cathode, and the charge layer or a layer on which the charge layer is supported forming at least part of a vacuum-tight partition between the modulation layer and the cathode.

Systems of this kind for high-intensity reproduction of electronically transmitted or stored images on a large projection surface have long been known. They comprise in practice of a projector in which the image is formed on a transparent deformable modulation layer, on either side of which are disposed parts of a Schlieren optical system so adjusted that no light impinges upon the projection screen when the modulation layer is of uniform thickness. To produce a visible image the thickness of the modulation layer is varied by pointwise deformation of one of its surfaces, with the result that the projection screen is illuminated pointwise in accordance with these thickness variations.

The deformation of the surface of the modulation layer is produced by electrostatic forces. To this end, the charge layer of a dielectric material is disposed on one side of the modulation layer, and an electrode surface is disposed on the other side. When a charge pattern is produced on the charge surface by means of a mosaic or selectively deflected intensity-modulated electron beam, electric fields form between the charge surface and the electrode and result in deformation of the modulation layer.

It will be apparent that a deformation of the modulation layer corresponding to the charge pattern can be obtained only if the thickness of the charge layer and the distance between the latter and the modulation layer are very small. The modulation layer and the electrode are therefore incorporated in the same vacuum tube as the electron gun system and the charge layer. Since a vacuum of at least $10^{-4}$ mm Hg is required for the proper function of the electron gun system, and since the vapour pressure of the materials usable for the modulation layer and known heretofore is about 1 mm Hg, the cathode ray tube is divided into two chambers which are separated from one another so as to be vacuum-tight, the electron gun system and the charge layer being disposed in one chamber while the modulation layer is disposed in the other chamber.

U.S. Pat. Specification No. 3 517 126 and German Offenlegungsschrift No. 1 806 604 describe such image projection systems in detail, and particularly the cathode ray tubes used therein. In the tube described in the aforementioned U.S. Patent Specification, the charge layer is used as a vacuum-tight partition between the two chambers of the tube and also as a support for the electrode and the modulation layer. The electrode is constructed in the form of a perforate or mesh grid and is disposed between the charge layer and the modulation layer. In an optional embodiment of this tube, a reflecting layer is also provided between the electrode and the modulation layer. In the tube described in the German Offenlegungsschrift, the dielectric charge layer is also used as a vacuum-tight partition between the two chambers of the tube and as a support for at least the modulation layer. Since the modulation layer in both types of tubes is situated with its surface adjacent the charge layer bearing on the electrode or the reflecting layer or the charge layer, the modulation layer surface remote from the charge layer is deformed by the electrostatic forces.

It has been found in practice, and can be demonstrated by calculation, that it is a disadvantage for the vacuum-tight partition between the two chambers of the tube to be used as a support for the modulation layer in the manner as described in the above publications.

The production of the projected image as described by the pointwise thickness variation of a modulation layer disposed between the two parts of a Schlieren optical system gives an optimum contrast uniform over the entire image area only if the modulation layer is situated in one plane. With the above-mentioned pressure difference between the two chambers a glass or mica partition having a diameter of about 50 mm and a thickness of about $5 \times 10^{-3}$ mm tends to take up an arcuate shape. The maximum deflection from the plane surface at the centre of the partition is then about $12 \times 10^{-3}$ mm, which is equivalent to an angle of about $2 \times 10^{-3}$ rad between the edge zone of the curved partition and the normal plane. The contrast of a projected image produced with a modulation layer disposed on a curved support is necessarily non-uniform and decreases from the centre to the edges.

An object of this invention is to obviate the above disadvantage, and to this end the invention provides a cathode ray tube having a modulation layer whose surface remote from the charge layer rests on an optically transparent and non-deformable support and whose surface facing the charge layer is deformable.

In the first embodiment of the invention a cathode ray tube is provided in which one end of the envelope of the tube is provided with a prism which totally internally reflects a light beam provided by a projection system, one face of the prism providing a non-deformable support for the modulation layer. In a second embodiment one end of the cathode ray tube envelope is used as the non-deformable support. In either embodiment, the partition for dividing the tube into two chambers can be dispensed with if the charge layer is applied to the deformable surface of the modulation layer and is used as a vacuum-tight partition between the modulation layer and the cathode.

Figure 2:
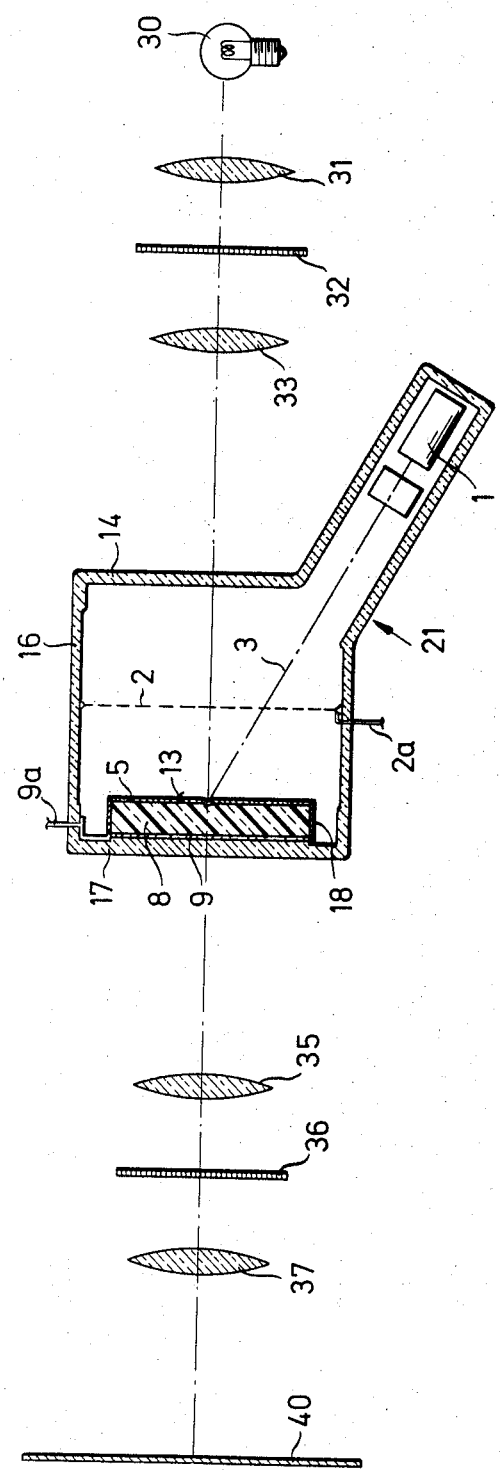

Two embodiments of the invention will now be explained with reference to the accompanying drawings in which:

FIG. 1 diagrammatically illustrates a projection system using a reflection method and incorporating a cathode ray tube in accordance with this invention;

FIG. 2 diagrammatically illustrates a projection system using a transmission method and incorporating a cathode ray tube in accordance with this invention.

Like or corresponding elements have been given like references in the drawings.

The image projection system shown in FIG. 1 uses a reflection method and comprises a light source 30 and a lens system 31 for illuminating a grid 32. Two lens systems 33 and 35 are also provided to project the image of the grid 32 on an identical grid 36. The grids 32 and 36 are the two parts of a Schlieren optical system. A projection lens 37 is provided in the path of the light from the grid 36 and forms the image of the latter on a projection screen 40.

The cathode ray tube 20 used in this system comprises a chamber 6, which is evacuated to at least $10^{-4}$ mm Hg and which contains an electron gun system 1 for producing an electron beam 3 emanating from the gun cathode. The chamber 6 also contains a pointwise apertured target plate 4 by means of which the electron beam 3 can be further deflected after $x$, $y$ deflection of the electron beam by a magnetic deflection coil 19.

An auxiliary electrode 2 with an external connection 2a is disposed between the target plate 4 and the gun cathode and at a predetermined distance from the target plate. The voltage at the auxiliary electrode enables the electron beam to strike the target plate practically at right angles. An electrically insulating dielectric charge layer 5 is provided on the side of the target plate remote from the gun cathode 1 and, together with the tube envelope wall 16, forms a vacuum-tight chamber 6. The electron beam 3 passes through the apertures in the target plate 4 and impinges on the dielectric charge layer 5, where it produces a pointwise charge corresponding to the beam current and the speed of deflection. A charge pattern in the form of a mosaic is thus produced on the charge layer 5.

A totally internally reflecting prism 10 is cemented on or fused into the cathode ray tube end face remote from the cathode. An electrically conductive optically transparent reference electrode 9 connected to an external electrical connection 9a is provided on the inside of the tube end face or the prism reflecting surface. A deformable modulation layer 8 is applied to the reference electrode. With this arrangement, one face of the prism 10 as in the illustrated embodiment, or the tube wall itself in the case where prism 10 is cemented onto the end face of the tube, forms a non-deformable support for the modulation layer and together with the tube wall and the charge layer 5 form a second chamber 7. The pressure in this chamber is determined by the vapour pressure of the deformable support layer and is 1 mm Hg maximum. Thus the charge layer 5 forms a vacuum-tight partition within the tube 20 between the modulation layer 8 and the gun cathode 1, and the deformable surface of the modulation layer faces the charge layer.

When the electron beam produces a charge pattern with varying charge density on the charge layer, electric fields form between these charges and the reference electrode 9 and produce a mutual attraction between the charge layer and the modulation layer. Since the charge layer 5 is secured to the relatively stiff target plate 4, this attraction is operative only on the modulation layer, the surface 13 of which is deformed according to the charge pattern on the charge layer.

As a result of its electrical conductivity, the target plate 4 can also be used to influence the electrostatic properties and hence control the tube operation and, more particularly, erase the charge on the charge layer by secondary electron multiplication. To this end, the target plate 4 is provided with an external connection 4a to which a corresponding control voltage can be applied. By appropriate selection of the voltages at the auxiliary electrode 2, reference electrode 9, cathode 1 and target plate 4, the tube operation can be controlled as will be familiar to those versed in the art.

With the embodiment illustrated, the mosaic target plate 4 has a thickness of approximately 1 mm and a diameter of 5 to 7 cm. The distance between the charge layer 5 and the modulation layer 8 is 20 $\mu$ maximum, and the possible variation of this distance due to deformation of the modulation layer is in the region of 2 to 5 $\mu$. The target plate may comprise completely of metal or of a support substrate, the surface of which is provided with an electrically conductive metal coating. The plate has about 100 apertures per cm. The charge layer 5 preferably consists of electrically highly insulating glass or mica, the resistivity of which is greater than $10^{10}$ ohms per cm, and has a thickness of about 2 $\mu$. The dielectric properties of the charge layer must always ensure that the applied charge remains for at least half a second at the original location without any appreciable change. The deformable modulation means is preferably a gel, for example weakly cross-linked silicone rubber or methyl siloxane having a modulus of elasticity of about 0.1 kg per square cm.

The rays of light of the optical projection system 30 to 33 impinge substantially at right angles on the 45° or 50° prism 10. These rays pass through the reference electrode 9 and the deformable modulation means 8 and are totally internally reflected at the free deformed surface 13 thereof, whereupon it emerges from the prism 10, again substantially at right angles, to impinge upon the projection screen 40 of the optical projection system. As a result of the grids 32 and 36 of the Schlieren optical system, the totally internally reflected beam of light produces an intensity variation in the projected image on the screen, said image corresponding to the deformation image on the deformed surface 13 of the modulation layer 8.

The prism 10 preferably has an optical refractive index of $n = 1.5$ to 1.6. The reference electrode 9 comprises a light-transmitting electrically conductive layer (NESA layer) and has a thickness of some hundred Angstrom units A. Since the free space between the modulation layer 8 and the charge layer 5 has a refractive index of a vacuum, i.e. $n = 1$, the deformable surface 13 of the modulation layer 8 forms the boundary between a denser and thinner medium on which the light of the projection system is totally reflected with the selected angle of incidence of about 45° to 50°. The local deviations from a plane reflecting surface such as occur on deformation of the surface 13 are insignificant, since these deformations are in the order of magnitude of $10^3$.A and hence the angle variations remain so small that the light undergoes total reflection everywhere at the surface of the modulation layer.

Although not necessary for the total reflection described, an additional reflecting layer 15 may be applied, for example by vapour coating, to the surface 13 of the modulation layer 8.

As already described hereinbefore, when the system is in operation, an image of the grid 32 illuminated by the light source 30 is projected on the grid 36. The prism 10 with the modulation layer 8 is disposed in the path of the light between the two grids, the latter being so aligned in relation to one another that the illuminated slits of the grid 32 are in register with the webs of the grid 36 when the modulation layer is undeformed, so that no light can impinge on the projection screen 40. When a charge pattern is induced on the charge layer 5 by means of the electron beam 3, so that the surface 13 of the modulation layer is deformed, the modulation layer exhibits locally varying thicknesses corresponding to the deformations. These thickness variations cause light to be projected from the illuminated slits of the grid 32 through the slits of the grid 36 and on to the projection screen 40. This process will be familiar to any one versed in the art and is described in the literature and will not therefore be explained in detail.

The system shown diagrammatically in FIG. 2 is intended for a transmission method, in which the projected light is not reflected at the surface of the modulation layer but passes therethrough. This system also comprises a light source 30 and a lens system 31 for illuminating a first grid 32. The other two lens systems 33 and 35 are provided for projecting an image of the grid 32 on the grid 36. The projection lens system 37 forms the image of the grid 36 on the projection screen 40.

The cathode ray tube 21 is disposed between the two lens systems 33 and 35. In this tube, the electron gun system 1, which in this example is intended for electrostatic focusing and deflection, is disposed outside the axis of symmetry of the tube in order to avoid obstructing the path of the projection light. Like the tube 20 shown in FIG. 1, the tube 21 contains an auxiliary electrode 2. The front wall 14 and the back wall 17 of the tube envelope 16 are optical plane surfaces which produce neither selective phase shift nor selective deflection of the transmitted light. An electrically conductive and optically transparent reference electrode 9 is disposed on the inside of the plane back wall 17 and the modulation layer 8 is disposed thereon. The modulation layer is mounted in a ring 18 and the charge layer 5 is applied directly on the deformable surface and forms a seal with the edges of the ring. In this embodiment, therefore, the plane back wall or the screen of the cathode ray tube is used as a non-deformable support for the modulation layer. It is not necessary in this embodiment for the tube to be sub-divided into two chambers which are separated so as to be vacuum-tight because the modulation layer is enclosed on all sides by the back wall 17 of the tube envelope, the ring 18 and the charge layer 5. However, as in the case of the embodiment of the invention according to FIG. 1, the charge layer 5 forms at least a part of a vacuum-tight partition within tube 21 between the modulation layer 8 and the gun cathode 1, and the deformable surface of the modulation layer faces the charge layer.

Since the charge layer 5 is not freely mounted but rests on the modulation layer 8 and is deformed jointly therewith, no stiff target plate is required. Alternatively, however, a thin electrically conductive apertured layer of any metal may be provided on the surface of the charge layer 5 and can be used as a control grid. This layer, however, must not impair the elastic deformability of the charge layer and of the modulation layer. In this embodiment, the modulation layer must be sufficiently rigid to prevent the charge layer from sliding sideways relatively to the reference electrode 9 or being displaced. The charge layer must also be electron-resistant to protect the highly elastic modulation layer from the electron bombardment.

With this embodiment of the tube, the two surfaces attracted by the electrostatic forces, i.e., the reference electrode and the charge layer, are both borne on the enclosed deformable modulation layer. Owing to the very high electrostatic pressures produced, modulation media having a relatively high shear modulus can be used.

The system shown in FIG. 2 operates similarly to that shown in FIG. 1. The electron beam 3 from the cathode 1 produces a charge pattern on the charge layer 5. An electrostatic field and a corresponding electrostatic force distribution form as a result of the charge distribution between the charge layer 5 and the reference electrode 9. This force distribution results in deformation of the modulation layer 8 and the charge layer 5 and produces a corresponding deformation image on the surface 13. The differing thickness of the modulation layer results in a locally varying phase shift of the projected light, which is then converted into an intensity-modulated image on the projection screen 40 by means of a Schlieren optical system or by a phase contrast process.

Two embodiments of a cathode ray tube used in a projection system have been described above and shown in the drawings. The system shown in FIG. 1 using the reflection method comprises a tube in which the charge layer 5 is spaced from the modulation layer 8 and the tube is divided into two chambers 6 and 7 which are separated from one another so as to be vacuum-tight. The apparatus shown in FIG. 2 using the transmission method contains a tube in which the charge layer bears directly against the modulation layer and can be deformed together therewith. It should be expressly pointed out that it is possible, without any disadvantage, to change over the charge layer arrangement in the two types of tube, i.e., allow the charge layer to bear directly on the deformable surface of the modulation layer in the reflection method tube and space the charge layer from the modulation layer in the transmission method tube, in which case the charge layer is secured on a mechanical support for example, on a perforate target plate.

What is claimed is:

1. A cathode ray tube comprising an envelope, and within said envelope a cathode, a charge layer of an electrically non-conductive material, a non deformable optically transparent support, an electrostatically deformable modulation layer on said non-deformable support and an optically transparent electrode disposed between the modulation layer and the optically transparent and non-deformable support, the charge layer being disposed between the modulation layer and the cathode to form at least part of a vacuum-tight partition within said envelope between the modulation layer and the cathode, and the non-deformable support and its modulation layer being positioned so that the deformable surface of the modulation layer faces the charge layer, the surface remote from the charge layer resting on said non-deformable optically transparent support.

2. A cathode ray tube according to claim 1, including an optically reflecting layer applied to the deformable surface of the modulation layer.

3. A cathode ray tube according to claim 1, wherein the charge layer rests on the deformable surface of the modulation layer and forms at least part of the vacuum-tight partition between the modulation layer and the cathode.

4. A cathode ray tube according to claim 1, including a wall encircling said modulation layer, the charge layer providing a seal with the edges of said wall to provide said vacuum-tight partition.

5. A cathode ray tube according to claim 1, wherein the materials of the non-deformable support, the optically transparent electrode and the deformable modulation layer have at least substantially the same refractive index.

6. A cathode ray tube according to claim 1, including a point-apertured target plate on which the charge layer is supported in spaced relation to the modulation layer, the charge layer being located a maximum distance of 20 microns from the modulation layer.

* * * * *